United States Patent
Kim

(10) Patent No.: US 8,464,070 B2
(45) Date of Patent: Jun. 11, 2013

(54) APPARATUS AND METHOD FOR TRANSMITTING AND RECEIVING DATA

(75) Inventor: Dae Youb Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 12/796,483

(22) Filed: Jun. 8, 2010

(65) Prior Publication Data

US 2011/0002459 A1 Jan. 6, 2011

(30) Foreign Application Priority Data

Jun. 8, 2009 (KR) ........................ 10-2009-0050392

(51) Int. Cl.
*H04L 9/00* (2006.01)
*G06F 11/30* (2006.01)

(52) U.S. Cl.
USPC ................. 713/189; 726/26; 726/27; 726/28; 726/29; 726/30

(58) Field of Classification Search
USPC ....................................................... 713/189
See application file for complete search history.

(56) References Cited

U.S. PATENT DOCUMENTS

| 7,401,217 B2 | 7/2008 | Huang et al. |
| 7,934,095 B2 * | 4/2011 | Laberteaux et al. .......... 713/169 |
| 2008/0125043 A1 | 5/2008 | Karmanenko et al. |

FOREIGN PATENT DOCUMENTS

| EP | 1 343 286 A1 | 9/2003 |
| KR | 10-0813007 B1 | 3/2008 |

OTHER PUBLICATIONS

A. Perrig et al., "The TESLA Broadcast Authentication Protocol," *CryptoBytes*, vol. 5, No. 2, Summer/Fall 2002, pp. 2-13.
A. Wood et al., "Denial of Service in Sensor Networks," *Computer*, vol. 35, No. 10, Oct. 2002, pp. 54-62.
M. Bohge et al. "TESLA Certificates: An Authentication Tool for Networks of Compute-Constrained Devices,"*Proceedings of the 6th International Symposium on Wireless Personal Multimedia Communications (WPMC'03)*, Oct. 19-22, 2003, Yokosuka, Japan, pp. 1-5.

* cited by examiner

*Primary Examiner* — Longbit Chai
(74) *Attorney, Agent, or Firm* — NSIP Law

(57) ABSTRACT

Provided is an apparatus to transmit and receive data, and a method thereof. A data transmission apparatus may generate a first cryptogram and a second cryptogram by encrypting a message authentication code to be transmitted, using a plurality of encryption keys, and may transmit the generated first cryptogram and the second cryptogram to a data reception apparatus.

20 Claims, 9 Drawing Sheets

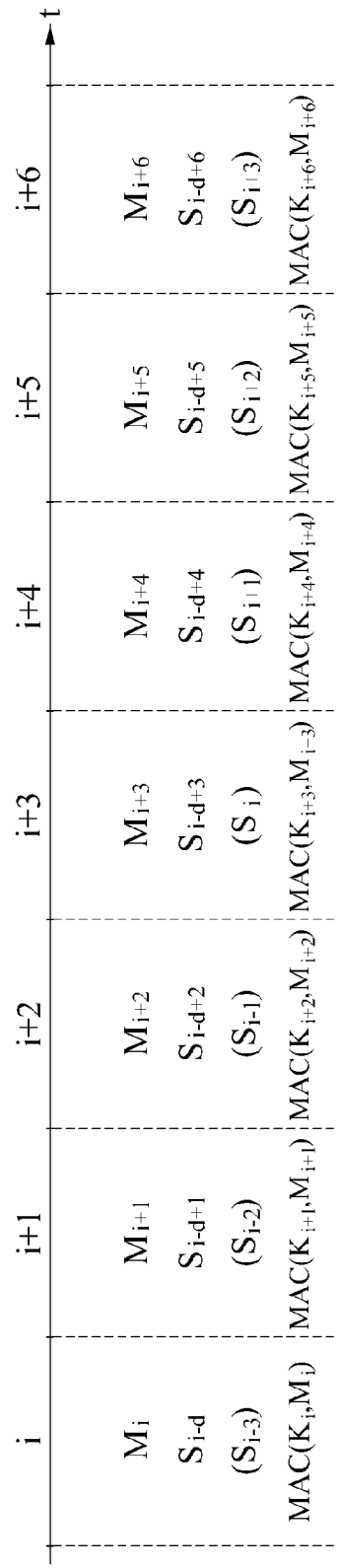

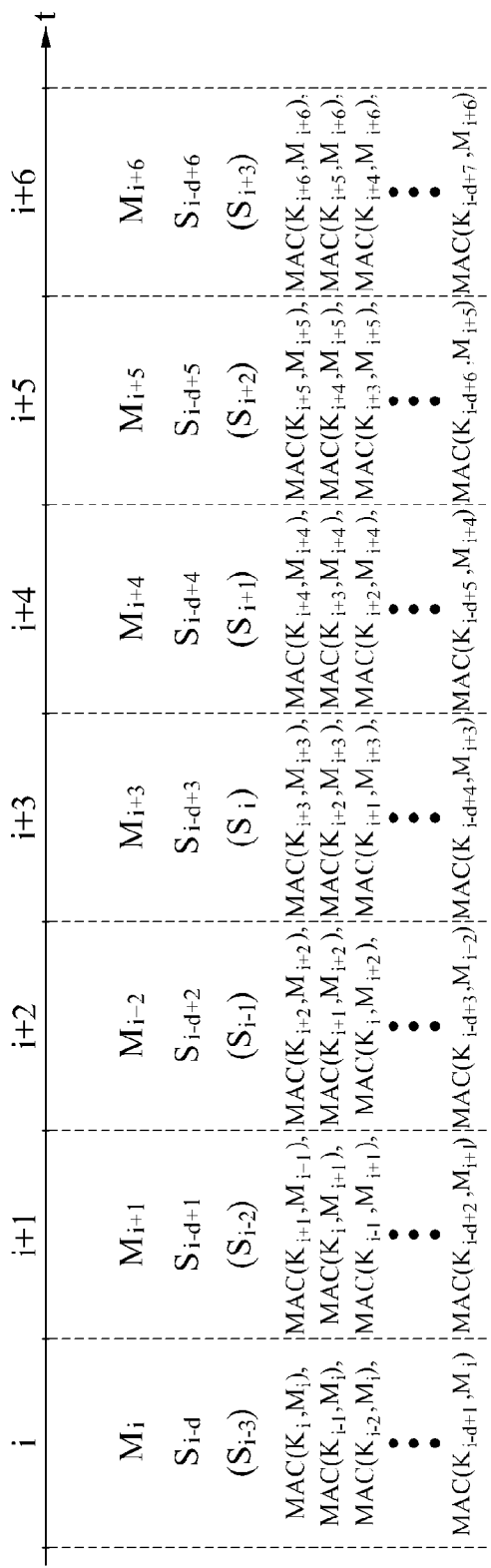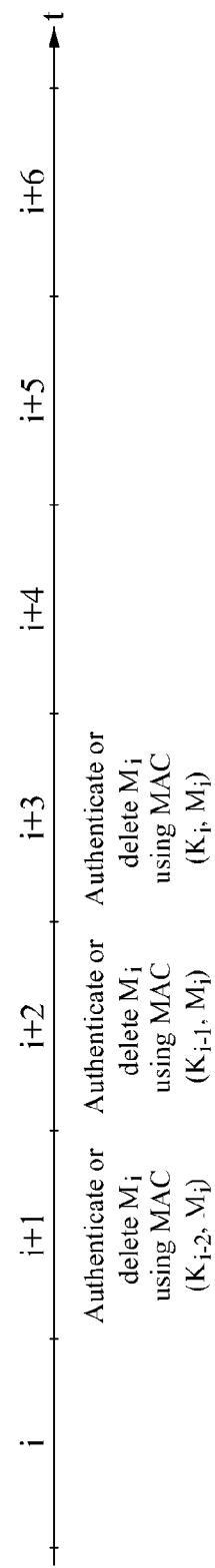

APPARATUS AND METHOD FOR TRANSMITTING AND RECEIVING DATA

CROSS-REFERENCE TO RELATED APPLICATIONS

This application claims the benefit under 35 U.S.C. §119(a) of Korean Patent Application No. 10-2009-0050392 filed on Jun. 8, 2009, in the Korean Intellectual Property Office, the entire disclosure of which is incorporated herein by reference.

BACKGROUND

1. Field

The following description relates to an apparatus to transmit and receive data, and a method thereof, and more particularly, to an apparatus to transmit and receive data that may reduce amounts of data transmitted during a message authentication, and may also be effectively prevent a denial-of-service (DoS) attack, and a method thereof.

2. Description of Related Art

With the rapid development of various types of high speed Internet environments, there is a need for methods which prevent Internet criminals from infiltrating networks. In particular, where a server crashes or personal information is leaked due to an attack on a network by a computer hacker, a large amount of damage may be caused to an operator of a large portal site.

Types of network attacks may include an attack of hacking an Internet site to obtain confidential information or personal information, an attack of infecting a plurality of client computers with a malicious code (e.g., a computer virus or worm) to make the client computers transmit a large number of packets to a particular network system at one time and to thereby cause a server of the network system to go down, and the like.

In particular, the second type of above-mentioned network attack is also referred to as a denial-of-service (DoS) attack. Generally, the DoS attack may use a very simple attacking scheme. Tools to perform the DoS attack are readily available on the Internet and even an inexperienced computer hacker may easily attack a network system using the DoS attack.

Accordingly, there is a need for a method that may effectively defend against the DoS attack.

SUMMARY

In one general aspect, a data transmission apparatus includes an authentication code generator to generate a message authentication code using an i-th message and an encryption key assigned to the i-th message, wherein i denotes an integer greater than or equal to 1, an encryption unit to generate a first cryptogram by encrypting the message authentication code using encryption keys from an encryption key assigned to an (i−1)-th message to an encryption key assigned to an (i−d+1)-th message, and to generate a second cryptogram by encrypting the message authentication code using encryption keys from the encryption key assigned to the (i−1)-th message to an encryption key assigned to an (i-d)-th message, wherein d denotes an integer greater than or equal to 1, and a transmitter to transmit the i-th message, the first cryptogram, and the second cryptogram.

The encryption unit may generate the first cryptogram by sequentially encrypting the message authentication code using the encryption keys from the encryption key assigned to the (i−1)-th message to the encryption key assigned to the (i−d+1)-th message, and may generate the second cryptogram by sequentially encrypting the message authentication code using the encryption keys from the encryption key assigned to the (i−1)-th message to the encryption key assigned to the (i-d)-th message.

The transmitter may transmit the i-th message, the first cryptogram, the second cryptogram, and the encryption key assigned to the (i-d)-th message.

In another general aspect, a data reception apparatus includes a receiver to receive a first data packet that includes an i-th message, a first cryptogram associated with the i-th message, and a second cryptogram associated with the i-th message, and a second data packet that includes an encryption key assigned to an (i-k)-th message, wherein i denotes an integer greater than or equal to 1 and k denotes an integer greater than or equal to zero, a storage unit to store the i-th message, the first cryptogram, and the second cryptogram, and a control unit to manage a storage status of the i-th message, the first cryptogram, and the second cryptogram, using the encryption key assigned to the (i-k)-th message, the i-th message, the first cryptogram, and the second cryptogram.

The first cryptogram may be generated by sequentially encrypting a message authentication code using encryption keys from an encryption key assigned to an (i−1)-th message to an encryption key assigned to an (i−d+1)-th message, and the message authentication code may be generated using the i-th message and an encryption key assigned to the i-th message, and d may denote an integer greater than k, and the second cryptogram may be generated by sequentially encrypting the message authentication code using encryption keys from the encryption key assigned to the (i−1)-th message to an encryption key assigned to an (i-d)-th message.

The control unit may restore an encryption key assigned to an (i-k−1)-th message from the encryption key assigned to the (i-k)-th message, generate a second decryptogram by decrypting the second cryptogram using the restored encryption key assigned to the (i-k−1)-th message, and manage the storage status of the i-th message, the first cryptogram, and the second cryptogram through a comparison between the first cryptogram and the second decryptogram.

In response to the second decryptogram being identical to the first cryptogram, the control unit may generate a first decryptogram by decrypting the first cryptogram using the encryption key assigned to the (i-k)-th message, may substitute the first cryptogram with the first decryptogram, may store the first decryptogram in the storage unit, may substitute the second cryptogram with the second decryptogram, and may store the second decryptogram in the storage unit.

In response to the second decryptogram being different from the first cryptogram, the control unit deletes, from the storage unit, the i-th message, the first cryptogram, and the second cryptogram.

The control unit may generate a message authentication code associated with the i-th message using the i-th message and the encryption key assigned to the (i-k)-th message, and manage the storage status of the i-th message, the first cryptogram, and the second cryptogram through a comparison between the message authentication code and the first cryptogram.

In response to the message authentication code being different from the first cryptogram, the control unit may delete, from the storage unit, the i-th message, the first cryptogram, and the second cryptogram.

In still another general aspect, a data transmission method includes generating a message authentication code using an i-th message and an encryption key assigned to the i-th message, wherein i denotes an integer greater than or equal to 1, generating a first cryptogram by encrypting the message authentication code using encryption keys from an encryption key assigned to an (i−1)-th message to an encryption key assigned to an (i−d+1)-th message, and generating a second cryptogram by encrypting the message authentication code using encryption keys from the encryption key assigned to the (i−1)-th message to an encryption key assigned to an (i-d)-th message, wherein d denotes an integer greater than or equal to 1, and transmitting the i-th message, the first cryptogram, and the second cryptogram.

The generating of the first cryptogram and the second cryptogram may include generating the first cryptogram by sequentially encrypting the message authentication code using the encryption keys from the encryption key assigned to the (i−1)-th message to the encryption key assigned to the (i−d+1)-th message and generating the second cryptogram by sequentially encrypting the message authentication code using the encryption keys from the encryption key assigned to the (i−1)-th message to the encryption key assigned to the (i-d)-th message.

The transmitting may include transmitting the i-th message, the first cryptogram, the second cryptogram, and the encryption key assigned to the (i-d)-th message.

In yet another general aspect, there is provided a method of receiving data, the method including receiving a first data packet that includes an i-th message, a first cryptogram associated with the i-th message, and a second cryptogram associated with the i-th message, wherein i denotes an integer greater than or equal to 1, storing the i-th message, the first cryptogram, and the second cryptogram, receiving a second data packet that includes an encryption key assigned to an (i-k)-th message, wherein k denotes an integer greater than or equal to zero, and managing a storage status of the i-th message, the first cryptogram, and the second cryptogram using the encryption key assigned to the (i-k)-th message, the i-th message, and the first cryptogram, and the second cryptogram.

The first cryptogram may be generated by sequentially encrypting a message authentication code using encryption keys from an encryption key assigned to an (i−1)-th message to an encryption key assigned to an (i−d+1)-th message, and the message authentication code may be generated using the i-th message and an encryption key assigned to the i-th message, and d denotes an integer greater than k, and the second cryptogram may be generated by sequentially encrypting the message authentication code using encryption keys from the encryption key assigned to the (i−1)-th message to an encryption key assigned to an (i-d)-th message.

The managing may include restoring an encryption key assigned to an (i-k−1)-th message from the encryption key assigned to the (i-k)-th message, generating a second decryptogram by decrypting the second cryptogram using the restored encryption key assigned to the (i-k−1)-th message, and managing the storage status of the i-th message, the first cryptogram, and the second cryptogram through a comparison between the first cryptogram and the second decryptogram.

In response to the second decryptogram being identical to the first cryptogram, the managing may include generating a first decryptogram by decrypting the first cryptogram using the encryption key assigned to the (i-k)-th message, substituting the first cryptogram with the first decryptogram, storing the first decryptogram, substituting the second cryptogram with the second decryptogram and storing the second decryptogram.

In response to the second decryptogram being different from the stored first cryptogram, the managing may include deleting the stored i-th message, the stored first cryptogram, and the stored second cryptogram.

The managing may include generating a message authentication code associated with the i-th message using the i-th message and the encryption key assigned to the (i-k)-th message, and managing the storage status of the i-th message, the first cryptogram, and the second cryptogram through a comparison between the message authentication code and the first cryptogram.

In response to the message authentication code being different from the first cryptogram, the managing may include deleting the stored i-th message, the stored first cryptogram, and the stored second cryptogram.

In another general aspect, there is provided a system to transmit and receive data, including an authentication code generator to generate a message authentication code using an i-th message and an encryption key assigned to the i-th message, wherein i denotes an integer greater than or equal to 1; an encryption unit to generate a first cryptogram by encrypting the message authentication code using encryption keys from an encryption key assigned to an (i−1)-th message to an encryption key assigned to an (i−d+1)-th message, and to generate a second cryptogram by encrypting the message authentication code using encryption keys from the encryption key assigned to the (i−1)-th message to an encryption key assigned to an (i-d)-th message, wherein d denotes an integer greater than or equal to 1; a transmitter to transmit a first data packet that includes the i-th message, the first cryptogram, and the second cryptogram, and a second data packet that includes the encryption key assigned to the (i-d)-th message; a receiver to receive the first data packet that includes the i-th message, the first cryptogram, the second cryptogram, and the second data packet that includes the encryption key assigned to the (i-d)-th message; a storage unit to store the i-th message, the first cryptogram, and the second cryptogram; and a control unit to manage a storage status of the i-th message, the first cryptogram, and the second cryptogram, using the encryption key assigned to the (i-d)-th message, the i-th message, the first cryptogram, and the second cryptogram.

Other features and aspects will be apparent from the following detailed description, the drawings, and the claims.

BRIEF DESCRIPTION OF THE DRAWINGS

FIGS. 1A and 1B are diagrams illustrating an example of a concept of a TESLA (Timed Efficient Stream Loss-tolerant Authentication) protocol;

FIGS. 2A and 2B are diagrams illustrating an example of a concept of a staggered TESLA protocol;

Throughout the drawings and the detailed description, unless otherwise described, the same drawing reference numerals will be understood to refer to the same elements, features, and structures. The elements may be exaggerated for clarity, illustration and convenience.

DETAILED DESCRIPTION

Figure 3:
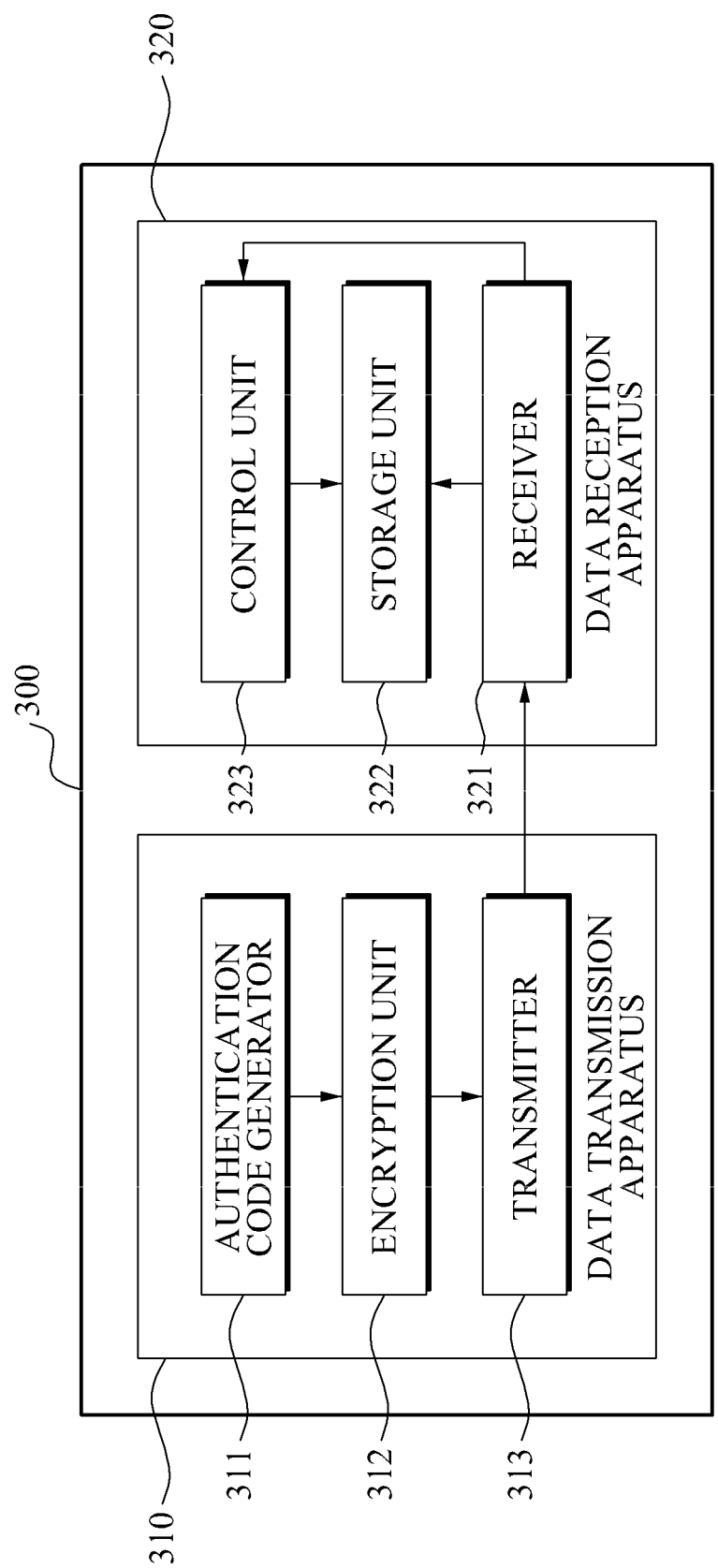
FIG. 3 is a block diagram illustrating an example of a configuration of a system to transmit and receive data.

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Descriptions of well-known functions and constructions may be omitted for increased clarity and conciseness.

FIGS. 1A and 1B illustrate an example of a concept of a Timed Efficient Stream Loss-tolerant Authentication (TESLA) protocol.

The TESLA protocol may include a message authentication code and a message in a data packet, and may transmit the data packet to verify that the data packet is transmitted from an authenticated source. Through this, the TESLA protocol may protect a data transmission apparatus (e.g., a server) and a data reception apparatus (e.g., a terminal) from a denial-of-service (DoS) attack.

Hereinafter, an example of transmitting the data packet from the data transmission apparatus to the data reception apparatus according to the TESLA protocol will be described with reference to FIG. 1A.

In a first operation, the data transmission apparatus may divide a time where the data packet is transmitted, into intervals each having a same duration. The data packet containing a single message may be transmitted in each of the intervals. Hereinafter, a message transmitted in an i-th interval is referred to as a message $M_i$.

In a second operation, the data transmission apparatus may allocate an encryption key to a corresponding message transmitted in each of the intervals. The encryption key may be used to generate a message authentication code associated with the message. Hereinafter, an encryption key assigned to the message $M_i$ is referred to as an encryption key $K_i$.

The data transmission apparatus may perform a one-way function operation corresponding to a seed to generate the encryption key, which may be expressed by the following Equation 1.

$$K_i = F_1(S_i) \quad \text{[Equation 1]}$$

In the above Equation 1, $F_{1(\ )}$ denotes a one-way function and $S_i$ denotes a seed with respect to the encryption key $K_i$.

A seed $S_{i-1}$ with respect to an encryption key $k_{i-1}$ assigned to a message $M_{i-1}$ may be calculated from the seed $S_i$ with respect to the encryption key $K_i$ assigned to the message $M_i$, which may be expressed by the following Equation 2.

$$S_{n-1} = F_2(S_n) \quad \text{[Equation 2]}$$

In the above Equation 2, $F_2(\ )$ denotes the one-way function.

In a third operation, the data transmission apparatus may generate the message authentication code associated with the message using the encryption key assigned to the message.

In a fourth operation, the data transmission apparatus may transmit, to the data reception apparatus, the data packet that includes the message, the message authentication code, and the seed of the encryption key. In this case, a seed of an encryption key transmitted in each of the intervals may be a seed of an encryption key assigned to a message being transmitted in a previous interval being d intervals prior to a current interval. Here, d denotes an integer greater than or equal to 1 and may be determined based on a maximum network delay for all the recipients, that is, all the data reception apparatuses to receive the data packet transmitted from the data transmission apparatus.

For example, as illustrated in FIG. 1A, a data packet transmitted in an i-th interval may include the message $M_i$, a seed $S_{i-d}$ of an encryption key $K_{i-d}$ assigned to a message $M_{i-d}$ being transmitted d intervals prior to the message $M_i$, and a message authentication code $MAC(K_i, M_i)$ associated with the message $M_i$. Here, the message $M_i$ may be generated using the encryption key $K_i$. The seed $S_i$ of the encryption key $K_i$ assigned to the message $M_i$ may be transmitted in an (i+d)-th interval after d intervals from the i-th interval. Hereinafter, the data packet transmitted to the data reception apparatus according to the TESLA protocol is referred to as a TESLA packet. The TESLA packet transmitted in the i-th interval may be expressed by TESLA packet $\{M_i, MAC(K_i, M_i), S_{i-d}\}$.

For example, where d has a value of 3, a TESLA packet $\{M_i, MAC(K_i, M_i), S_{i-3}\}$ may be transmitted in the i-th interval, and a TESLA packet $\{M_{i+3}, MAC(K_{i+3}, M_{i+3}), S_i\}$ may be transmitted in an (i+3)-th interval.

Hereinafter, an operation of the data reception apparatus to authenticate a message included in a received data packet will be described with reference to FIG. 1B.

The data reception apparatus may store the message $M_i$ and the message authentication code $MAC(K_i, M_i)$ that are included in the TESLA packet $\{M_i, MAC(K_i, M_i), S_{i-d}\}$ transmitted in an i-th interval. The data reception apparatus may buffer the message $M_i$ and the message authentication code $MAC(K_i, M_i)$ until the seed $S_i$ of the encryption key $K_i$ assigned to the message $M_i$ is received.

In an (i+d)-th interval, the data reception apparatus may receive the TESLA packet $\{M_{i+d}, MAC(K_{i+d}, M_{i+d}), S_i\}$ including the seed $S_i$ of the encryption key $K_i$ assigned to the message $M_i$. The data reception apparatus may calculate the encryption key $K_i$ from the seed $S_i$, and may authenticate the message $M_i$ using the encryption key $K_i$, and the message authentication code $MAC(K_i, M_i)$. Where the message $M_i$ is unauthenticated, the data reception apparatus may delete the message $M_i$ and the message authentication code $MAC(K_i, M_i)$.

For example, where d has a value of 3, the data reception apparatus may receive a TESLA packet $\{M_i, MAC(K_i, M_i), S_{i-3}\}$ in the i-th interval and buffer the message $M_i$ and the message authentication code $MAC(K_i, M_i)$ until an (1+3)-th interval. In the (i+3)-th interval, the data reception apparatus may authenticate the message $M_i$ using the seed $S_i$ included in a TESLA packet $\{M_{i+3}, MAC(K_{i+3}, M_{i+3}), S_i\}$.

As described above, in the TESLA protocol, the message $M_i$ and the message authentication code $MAC(K_i, M_i)$ may need to be buffered until the seed $S_i$ of the encryption key $K_i$ assigned to the message $M_i$ is received. Therefore, the TESLA protocol may be weak against a DoS attack such as an overflow attack. A staggered TESLA protocol is proposed to overcome the above weakness. Hereinafter, the staggered TESLA protocol will be described in detail with reference to FIGS. 2A and 2B.

FIGS. 2A and 2B illustrate diagrams illustrating an example of a concept of a staggered TESLA protocol.

A data transmission apparatus to transmit data according to the staggered TESLA protocol may additionally transmit (d−1) message authentication codes to a TESLA packet to protect a data reception apparatus from a DoS attack.

Hereinafter, an example of transmitting the data packet from the data transmission apparatus to the data reception apparatus according to the staggered TESLA protocol will be described with reference to FIG. 2A.

In a first operation, the data transmission apparatus may divide a time where a message is transmitted, into intervals having a same duration.

In a second operation, the data transmission apparatus may allocate an encryption key to a corresponding message transmitted in each of the intervals. Descriptions related to the first operation and the second operation will be the same as or similar to descriptions made above regarding the TESLA protocol illustrated in FIGS. 1A and 1B, and thus further detailed descriptions will be omitted.

In a third operation, the data transmission apparatus may generate a plurality of message authentication codes associated with a message to be transmitted in each of the intervals.

In a fourth operation, the data transmission apparatus may transmit, to the data reception apparatus, a data packet that includes the message, the plurality of message authentication codes, and a seed of an encryption key.

For example, the data transmission apparatus may generate a staggered TESLA packet with the additionally added (d−1) message authentication codes in the third operation, and may transmit the generated staggered TESLA packet to the data reception apparatus in the fourth operation.

Where a potential Internet criminal (e.g., computer hacker, virus programmer, etc.) desires to fabricate a message $M_i$, the Internet criminal may be unaware of an encryption key $K_i$, and encryption keys $K_{i-1}$ through $K_{i-d+1}$. Accordingly, the data transmission apparatus may further transmit a message authentication code $MAC(K_i, M_i)$ and the (d−1) message authentication codes and thereby make it more difficult for the Internet criminal to fabricate the message $M_i$, and may protect the data reception apparatus from the DoS attack.

The (d−1) message authentication codes may include message authentication codes $MAC(K_{i-1}, M_i)$, $MAC(K_{i-2}, M_i)$, ..., $MAC(K_{i-d+1}, M_i)$ associated with the message $M_i$ that are generated using the encryption keys $K_{i-1}$ through $K_{i-d+1}$. Specifically, the data transmission apparatus to transmit data according to the staggered TESLA protocol may transmit, to the data reception apparatus, a staggered TESLA packet $\{M_i, MAC(K_i, M_i), MAC(K_{i-1}, M_i), MAC(K_{i-2}, M_i), ..., MAC(K_{i-d+1}, M_i), S_{i-d}\}$ in an i-th interval.

For example, where d has a value of 3, a staggered TESLA packet $\{M_i, MAC(K_i, M_i), MAC(K_i, M_i), MAC(K_{i-2}, M_i), S_{i-3}\}$ may be transmitted in the i-th interval. A staggered TESLA packet $M_{i+3}, MAC\{K_{i+3}, M_{i+3}), MAC(K_{i-4}, M_{i+3}), MAC(K_{i-5}, M_{i+3}), S_i\}$ may be transmitted in an (1+3)-th interval.

Hereinafter, an operation of the data reception apparatus to authenticate a message included in a received data packet will be described with reference to FIG. 2B.

In the i-th interval, the data reception apparatus may receive the staggered TESLA packet $\{M_i, MAC(K_i, M_i), MAC(K_{i-1}, M_i), MAC(K_{i-2}, M_i), ..., MAC(K_{i-d+1}, M_i), S_{i-d}\}$, and may store the message $M_i$, and message authentication codes $MAC(K_i, M_i)$ through $MAC(K_{i-d+1}, M_i)$ that are included in the staggered TESLA packets.

In an (i+1)-th interval, the data reception apparatus may receive a staggered TESLA packet $\{M_{i+1}, MAC(K_{i+1}, M_{i+1}), MAC(K_i, M_{i+1}), MAC(K_{i-1}, M_{i+1}), ..., MAC(K_{i-d+2}, M_{i+1}), S_{i-d+1}\}$, and may determine whether to maintain or delete the stored message $M_i$ based on the seed $S_{i-d+1}$ and the message authentication code $MAC(K_{i-d+1}, M_i)$ that are stored in the staggered TESLA packet.

For example, the data transmission apparatus may calculate an encryption key $K_{i-d+1}$ from the seed $S_{i-d+1}$ using the above Equation 1, and may generate a message authentication code $MAC'(K_{i-d+1}, M_i)$ associated with the message $M_i$ using the encryption key $K_{i-d+1}$. The data transmission apparatus may compare whether the generated message authentication code $MAC'(K_{i-d+1}, M_i)$ is identical to the stored message authentication code $MAC(K_{i-d+1}, M_i)$. Where the message authentication code $MAC'(K_{i-d+1}, M_i)$ is identical to the message authentication code $MAC(K_{d+1}, M_i)$, the data reception apparatus may continuously buffer the message $M_i$ and the remaining message authentication codes $MAC(K_i, M_i)$ through $MAC(K_{i-d+2}, M_i)$. Conversely, where the message authentication code $MAC(K_{i-d+1}, M_i)$ is different from the message authentication code $MAC(K_{i-d+1}, M_i)$, the data reception apparatus may delete the message $M_i$ and the remaining message authentication codes $MAC(K_i, M_i)$ through $MAC(K_{i-d+2}, M_i)$.

In an (i+2)-th interval, the data reception apparatus may receive a staggered TESLA packet $\{M_{i+2}, MAC(K_{i+2}, M_{i+2}), MAC(K_{i-1}, M_{i+2}), MAC(K_i, M_{i+2}), ..., MAC(K_{i-d+3}, M_{i+2}), S_{i-d+2}\}$, and may determine whether to maintain or delete the stored message $M_i$ using a seed $S_{i-d+2}$ and a message authentication code $MAC(K_{i-d+2}, M_i)$ that are included in the received staggered TESLA packet. The above operation may be the same as the aforementioned operation of the data reception apparatus that may be performed in the (i+1)-th interval.

The data reception apparatus may repeat an operation of maintaining or deleting the message $M_i$ in each of the intervals until an (i+d)-th interval, that is, until the seed $S_i$ is received.

As illustrated in FIG. 2B, for example, in the case of d=3, where a generated message authentication code $MAC'(K_{i-2}, M_i)$ is identical to a stored message authentication code $MAC(K_{i-2}, M_i)$, the data reception apparatus may buffer the message $M_i$ and message authentication codes $MAC(K_{i-1}, M_i)$ and $MAC(K_i, M_i)$ in the (i+1)-th interval. In the (i+2)-th interval, where a generated message authentication code $MAC'(K_{i-1}, M_i)$ is identical to a stored message authentication code $MAC(K_{i-1}, M_i)$, the data reception apparatus may buffer the message $M_i$ and the message authentication code $MAC(K_i, M_i)$. In an (i+3)-th interval, where a generated message authentication code $MAC'(K_i, M_i)$ is identical to the stored message authentication code $MAC(K_i, M_i)$, the data reception apparatus may authenticate that the message $M_i$ as a valid message.

As described above, the data reception apparatus may verify whether the message $M_i$ is a valid message in advance before a d-th interval. Accordingly, it is possible to enhance a buffering efficiency of the message $M_i$.

According to the staggered TESLA protocol, a plurality of message authentication codes may need to be transmitted to the data reception apparatus, which may extend a length of a data packet to be transmitted. Since the data reception apparatus may need to store the plurality of message authentication codes, it may not provide efficient buffering. Accordingly, there is a need for a data transmission and reception protocol that may have similar positive functions to the staggered TESLA protocol, and may also decrease the length of the data packet to be transmitted and an amount of data to be buffered.

Hereinafter, a system to transmit and receive data according to an example will be described in detail with reference to FIG. 3.

FIG. 3 illustrates an example of a configuration of a system 300 to transmit and receive data.

Referring to FIG. 3, the system 300 includes a data transmission apparatus 310 and a data reception apparatus 320. The data transmission apparatus 310 includes an authentication code generator 311, an encryption unit 312, and a transmitter 313. The data reception apparatus 320 includes a receiver 321, a storage unit 322, and a control unit 323. Functions of the above system 300 and components thereof will be further described below.

Hereinafter, an operation of transmitting a data packet from the data transmission apparatus 310 to the data reception apparatus 320, and an operation of authenticating, by the data reception apparatus 320 receiving the data packet, a message included in the data packet will be described.

First, the operation of transmitting the data packet from the data transmission apparatus 310 to the data reception apparatus 320 will be described.

The data transmission apparatus 310 may divide a time where the data packet is transmitted, into intervals each having a same duration, and may transmit the data packet containing a single message in each of the intervals. The operation of transmitting the data packet in each of the intervals may be the same and thus only an operation of the data transmission apparatus 310 to transmit the data packet in an i-th interval will be described.

The authentication code generator 311 may generate a message authentication code associated with an i-th message using the i-th message and an encryption key assigned to the i-th message. As described above, the i-th message denotes a message $M_i$ transmitted in the i-th interval. The encryption key assigned to the i-th message denotes an encryption key $K_i$. The message authentication code associated with the i-th message denotes a message authentication code $MAC(K_i, M_i)$.

The encryption unit 312 may generate a first cryptogram by encrypting the message authentication code $MAC(K_i, M_i)$ using encryption keys from an encryption key assigned to an (i−1)-th message to an encryption key assigned to an (i−d+1)-th message, that is, using encryption keys from an encryption key $K_{i-1}$ to an encryption key $K_{i-d+1}$. The encryption unit 312 may generate a second cryptogram by encrypting the message authentication code $MAC(K_i, M_i)$ using encryption keys from the encryption key assigned to the (i−1)-th message to an encryption key assigned to an (i−d)-th message, that is, using encryption keys from the encryption key $K_{i-1}$ to an encryption key $K_{i-d}$.

To make it difficult for an Internet criminal to fabricate a message, the encryption unit 312 may encrypt the message authentication code $MAC(K_i, M_i)$ using a plurality of encryption keys. In this case, the encryption unit 312 may generate the first cryptogram by encrypting the message authentication code $MAC(K_i, M_i)$ using (d−1) encryption keys, that is, the encryption keys $K_{i-1}$ through $K_{i-d+1}$, and may generate the second cryptogram by encrypting the first cryptogram using the encryption key $K_{i-d}$. The first cryptogram and the second cryptogram may be used where the data reception apparatus 320 determines whether the message $M_i$ is valid. Hereinafter, the first cryptogram with respect to the message authentication code $MAC(K_i, M_i)$ is referred to as a cryptogram $A_i$, and the second cryptogram with respect to the message authentication code $MAC(K_i, M_i)$ is referred to as a cryptogram $C_i$.

The transmitter 313 may transmit the message $M_i$, the cryptogram $A_i$, and the cryptogram $C_i$ to the data reception apparatus 320. Here, the transmitter 313 may generate a data packet $\{M_i, A_i, C_i\}$ that includes the message $M_i$, the cryptogram $A_i$, and the cryptogram $C_i$, and may transmit the generated data packet $\{M_i, A_i, C_i\}$ to the data reception apparatus 320.

The transmitter 313 may generate a data packet $\{M_i, A_i, C_i, K_{i-d}\}$ that further includes the encryption key $K_{i-d}$ assigned to the (i−d)-th message in addition to the message $M_i$, the cryptogram $A_i$, and the cryptogram $C_i$, and may transmit the generated data packet $\{M_i, A_i, C_i, K_{i-d}\}$ to the data reception apparatus 320.

Referring to FIG. 3, the encryption unit 312 may generate the cryptogram $A_i$ by sequentially encrypting the message authentication code $MAC(K_i, M_i)$ using the encryption keys $K_{i-1}$ through $K_{i-d+1}$. The encryption unit 312 may generate the cryptogram $C_i$ by sequentially encrypting the message authentication code $MAC(K_i, M_i)$ using the encryption keys $K_{i-1}$ through $K_{i-d}$. Hereinafter, an operation of the data transmission apparatus 310 to generate the cryptogram $A_i$ and the cryptogram $C_i$ by sequentially encrypting the message authentication code $MAC(K_i, M_i)$ using the encryption keys $K_{i-1}$ through $K_{i-d}$ will be further described with reference to FIG. 4.

Figure 4:
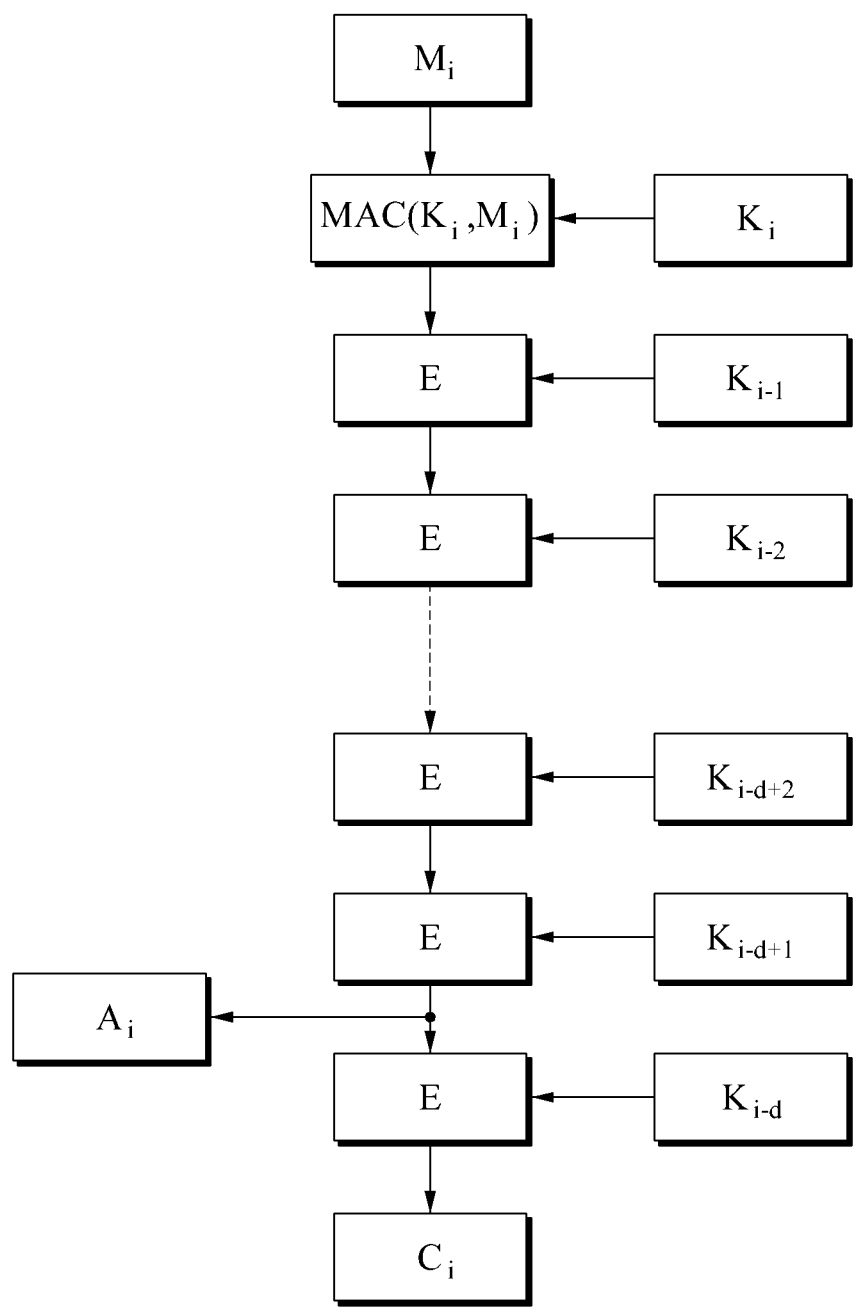
FIG. 4 is a diagram illustrating an example of an encryption operation that is performed by a data transmission apparatus.

FIG. 4 illustrates an example of an encryption operation that may be performed by the data transmission apparatus 310.

For ease of description, it is assumed that d is an integer greater than or equal to 5.

In a first operation, the data transmission apparatus 310 may generate a message authentication code $MAC(K_i, M_i)$ associated with a message $M_i$ using an encryption key $K_i$. The message authentication code $MAC(K_i, M_i)$ may be generated by the authentication code generator 311.

In a second operation, the data transmission apparatus may encrypt the message authentication code $MAC(K_i, M_i)$ using an encryption key $K_{i-1}$.

In a third operation, the data transmission apparatus may re-encrypt the encrypted message authentication code $MAC(K_i, M_i)$ using an encryption key $K_{i-2}$.

The data transmission apparatus 310 may generate a cryptogram $A_i$ by repeating the above sequential encryption using encryption keys $K_{i-3}$ through $K_{i-d+1}$. In a d-th operation, the data transmission apparatus 310 may generate a cryptogram $C_i$ by re-encrypting the cryptogram $A_i$ using an encryption key $K_{i-d}$. As described above, the cryptogram $A_i$ and the cryptogram $C_i$ may be generated by the encryption unit 312.

The data transmission apparatus 310 may generate the cryptogram $A_i$ and the cryptogram $C_i$ by sequentially applying the encryption keys $K_{i-1}$ through $K_{i-d}$ with respect to the message authentication code $MAC(K_i, M_i)$.

Hereinafter, the system 300 to transmit and receive data will be described again with reference to FIG. 3.

The data reception apparatus 320 to receive a data packet transmitted from the data transmission apparatus 310 may authenticate whether a message included in the data packet is a valid message, and may perform various types of processes using the authenticated message.

Hereinafter, an operation of authenticating, by the data reception apparatus 320, the message included in the data packet will be described.

Since the same message authentication operation is performed in each interval, an operation of the data reception apparatus 320 to authenticate the message $M_i$ received in the i-th interval will be described as an example.

The receiver 321 may receive the data packet $\{M_i, A_i, C_i, K_{i-d}\}$ in the i-th interval.

As described above, the cryptogram $A_i$ may be generated by sequentially encrypting the message authentication code $MAC(K_i, M_i)$ associated with the message $M_i$ using the encryption keys $K_i$ through $K_{i-d+1}$. Here, the message $M_i$ may be generated using the encryption key $K_i$. Also, the cryptogram $C_i$ may be generated by sequentially encrypting the message authentication code $MAC(K_i, M_i)$ using the encryption keys $K_{i-1}$ through $K_{i-d}$.

The storage unit 322 may store the message $M_i$, the cryptogram $A_i$, and the cryptogram $C_i$ that are included in the data packet $\{M_i, A_i, C_i, K_{i-d}\}$.

The receiver 321 may receive a data packet $\{M_j, A_j, C_j, K_{j-d}\}$ $\{M_j, A_j, C_j, K_{j-d}\}$ in a j-th interval. Here, j denotes an integer greater than i and less than i+d.

Since an encryption key $K_{j-d}$ transmitted in the j-th interval has been transmitted in an interval being k intervals prior to the message $M_i$, that is, in an (i−k)-th interval, the encryption key $K_{j-d}$ may be expressed by the encryption key $K_{i-k}$. Here, k denotes an integer greater than or equal to zero and less than d.

The control unit 323 may manage a storage status of the message $M_i$, the cryptogram $A_i$, and the cryptogram $C_i$ using the encryption key $K_{j-d}(=K_{i-k})$ included in the data packet $\{M_j, A_j, C_j, K_{j-d}(=K_{i-k})\}$ and the message $M_i$, the cryptogram $A_i$, and the cryptogram $C_i$ stored in the storage unit 322.

Prior to authenticating a validity of the message $M_i$ in an (i+d)-th interval, the control unit 323 may preliminarily determine the validity of the message $M_i$ and determine whether to maintain or delete the stored message $M_i$, the cryptogram $A_i$, and the cryptogram $C_i$. Accordingly, the data transmission apparatus 310 may verify whether the message $M_i$ is a valid message, in advance before the (i+d)-th interval, whereby a buffering efficiency of the message $M_i$ may be enhanced.

Hereinafter, an operation of the data reception apparatus 320 to manage the storage status of the message $M_i$, the cryptogram $A_i$, and the cryptogram $C_i$ using the encryption key $K_{j-d}(=K_{i-k})$, and the message $M_i$, the cryptogram $A_i$, and the cryptogram $C_i$ stored in the storage unit 322 will be further described with reference to FIG. 5.

Figure 5:
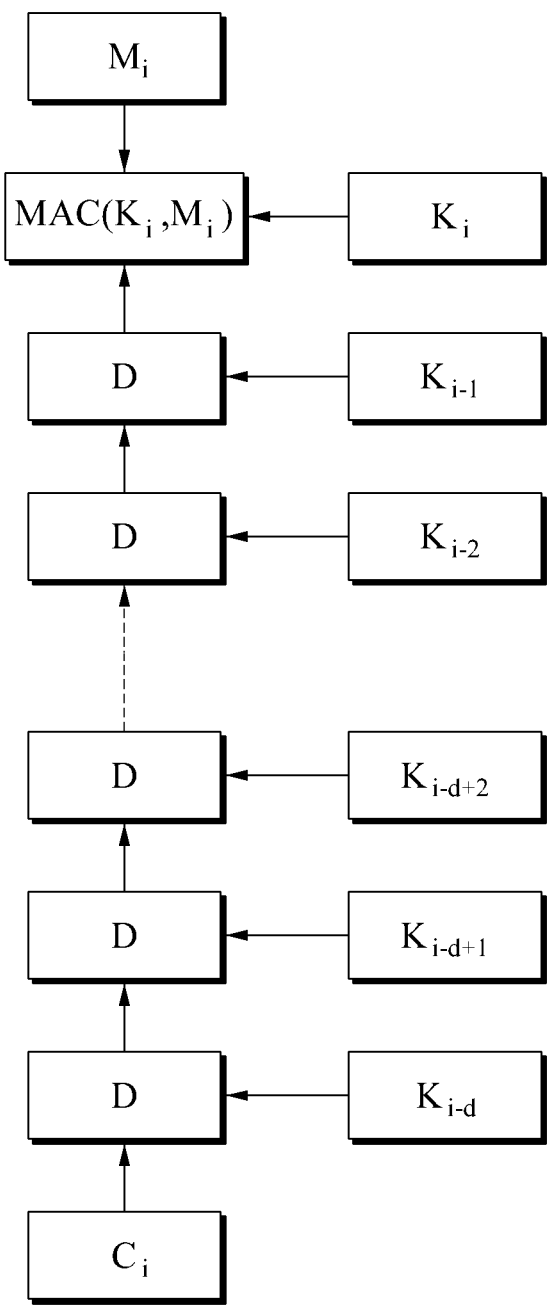
FIG. 5 is a diagram illustrating an example of a decryption operation that is performed by a data reception apparatus.

FIG. 5 is a diagram illustrating an example of a decryption operation that may be performed by the data reception apparatus 320.

Referring to FIG. 5, the message authentication code MAC $(K_i, M_i)$ may be restored by sequentially decrypting the cryptogram $C_i$ using restored encryption keys $K_{i-1}$ through $K_{i-d}$. If the restored message authentication code MAC$(K_i, M_i)$ is identical to a message authentication code MAC$(K_i, M_i)$ generated using the message $M_i$ received in the i-th interval and the encryption key $K_i$ received in the (i+d)-th interval, the message $M_i$ is determined to be valid. Conversely, if the restored message authentication code MAC$(K_i, M_i)$ is not identical to the generated message authentication code MAC $(K_i, M_i)$, the message $M_i$ is determined to be invalid. This procedure is described in greater detail below.

Where j=i+1, that is, in an (i+1)-th interval, the data reception apparatus 320 may perform the following operations. In a first operation, the receiver 321 may receive a data packet $\{M_{i+1}, A_{i+1}, C_{i+1}, K_{i-d+1}\}$.

In a second operation, the control unit 323 may restore an encryption key $K_{i-d}$ using an encryption key $K_{i-d+1}$, which may be performed similarly to the above Equation 2. Like a seed, an encryption key may be restored using a one-way function operation, as given by the following Equation 3.

$$K_{i-1} = F_3(K_i) \quad \text{[Equation 3]}$$

In the above Equation 3, $F_3(\ )$ denotes a one-way function.

In a third operation, the control unit 323 may generate a second decryptogram by decrypting a stored cryptogram $C_i$, that is, a second cryptogram, using the restored encryption key $K_{i-d}$. Hereinafter, the second decryptogram is referred to as a decryptogram $C_i'$.

The cryptogram $C_i$ may be generated by encrypting a cryptogram $A_i$, that is, a first cryptogram, using the encryption key $K_{i-d}$. Therefore, where a valid data packet is transmitted, the decryptogram $C_i'$ and the cryptogram $A_i$ may need to be identical to each other. Where the decryptogram $C_i'$ is different from the cryptogram $A_i$, the received data packet may be transmitted from an unauthenticated user. Therefore, the data reception apparatus 320 storing the message $M_i$ at an (i+d)-th interval may be ineffective in preventing an Internet criminal from infiltrating the system 300.

The control unit 323 may compare the decryptogram $C_i'$ and the cryptogram $A_i$ to manage the storage status of the message $M_i$, the cryptogram $A_i$, and the cryptogram $C_i$.

In a fourth operation, the control unit 323 may compare whether the decryptogram $C_i'$ is identical to the cryptogram $A_i$.

Where the decryptogram $C_i'$ is different from the cryptogram $A_i$, the control unit 323 may determine the message $M_i$ is an invalid message, and delete the message $M_i$, the cryptogram $A_i$, and the cryptogram $C_i$ stored in the storage unit 322 in a fifth operation.

Conversely, where the decryptogram $C_i'$ is identical to the cryptogram $A_i$, the control unit 323 may determine the message $M_i$ is a valid message in the fifth operation. In this case, the control unit 323 may generate a first decryptogram (hereinafter, referred to as $A_i'$) by decrypting the cryptogram $A_i$ using an encryption key $K_{i-d+1}$, and may substitute the cryptogram $A_i$ with the decryptogram $A_i'$ and store the decryptogram $A_i'$, and may substitute the cryptogram $C_i$ with the decryptogram $C_i'$ and store the decryptogram $C_i'$. Specifically, the control unit 323 may update the cryptogram $A_i$ and the cryptogram $C_i$ according to the following Equation 4.

$$C_i = D(K_{i-d}, C_i) \quad \text{[Equation 4]}$$

$$A_i = D(K_{i-d+1}, A_i)$$

In the above Equation 4, $D(\ )$ denotes a decryption operation.

Updating of the cryptogram $A_i$ and the cryptogram $C_i$ may be performed to preliminarily determine the validity of the message $M_i$ in a subsequent interval, that is, in an (i+2)-th interval.

Where j=i+2, that is, in the (i+2)-th interval, the data reception apparatus 320 may repeat the aforementioned preliminary determination regarding the message $M_i$. Hereinafter, the above-described preliminary determination regarding the message $M_i$ will be further described below.

In a first operation, the receiver 321 may receive a data packet $\{M_{i+2}, A_{i+2}, C_{i+2}, K_{i-d+2}\}$.

In a second operation, the control unit 323 may restore an encryption key $K_{i-d+1}$ using an encryption key $K_{i-d+2}$. The encryption key $K_{i-d+1}$ may be restored using the one-way function operation as given by the above Equation 3.

In a third operation, the control unit 323 may generate a decryptogram $C_i'$ by decrypting the stored cryptogram $C_i$ using the restored encryption key $K_{i-d+1}$.

In a fourth operation, the control unit 323 may compare whether the generated decryptogram $C_i'$ is identical to the stored cryptogram $A_i$.

Since the cryptogram $A_i$ and the cryptogram $C_i$ are updated in an (i+1)-th interval, the decrypted decryptogram $C_i'$ and the cryptogram $A_i$ may need to be identical to each other in the (i+2)-th interval where a valid data packet is received.

Where the decryptogram $C_i'$ is different from the cryptogram $A_i$, the control unit 323 may determine the message $M_i$ is an invalid message, and delete the message $M_i$, the cryptogram $A_i$, and the cryptogram $C_i$ stored in the storage unit 322, in a fifth operation.

Conversely, where the decryptogram $C_i'$ is identical to the cryptogram $A_i$, the control unit 323 may determine the message $M_i$ is a valid message in the fifth operation. In this case, the control unit 323 may generate a decryptogram $A_i'$ by decrypting the cryptogram $A_i$ using the received encryption key $K_{i-d+2}$, and may substitute the cryptogram $A_i$ with the decryptogram $A_i'$ and store the decryptogram $A_i'$, and may substitute the cryptogram $C_i$ with the decryptogram $C_i'$ and store the decryptogram $C_i'$, as given by the above Equation 4.

The data reception apparatus 320 may repeat the preliminary determination regarding the validity of the message $M_i$ until j=i+d−1, that is, until an (i+d−1)-th interval.

Where j=i+d, that is, in an (i+d)-th interval, the data reception apparatus 320 may perform an operational of finally determining whether the message $M_i$ is a valid message.

In a first operation, the receiver 321 may receive a data packet $\{M_{i+d}, A_{i+d}, C_{i+d}, K_i\}$.

In a second operation, the control unit 323 may generate a message authentication code MAC($K_i$, $M_i$), stored in the storage unit 322, using the received encryption key $K_i$.

The cryptogram $A_i$ updated in an (i+d−1)-th interval may be decrypted by sequentially applying encryption keys $K_{i-d+}1$ through $K_i\_1$ with respect to the cryptogram $A_i$ stored in the i-th interval. Specifically, the cryptogram $A_i$ may be decrypted by sequentially applying the encryption keys $K_{i-d}$ through $K_i\_1$ with respect to the cryptogram $C_i$ stored in the i-th interval. Therefore, where a valid data packet is received, the generated message authentication code MAC($K_i$, $M_i$) may need to be identical to the cryptogram $A_i$ stored in the (i+d−1)-th interval.

In a third operation, the control unit 323 may compare whether the generated message authentication code MAC($K_i$, $M_i$) is identical to the stored cryptogram $A_i$.

Where the generated message authentication code MAC($K_i$, $M_i$) is different from the stored cryptogram $A_i$, the control unit 323 may determine the message $M_i$ is an invalid message, and thus delete the message $M_i$, the cryptogram $A_i$, and the cryptogram $C_i$ stored in the storage unit 322 in a fourth operation.

Where the generated message authentication code MAC($K_i$, $M_i$) is identical to the stored cryptogram $A_i$, the control unit 323 may determine or authenticate the message $M_i$ is a valid message in the fourth operation.

Referring to FIGS. 3 and 5, it is possible to decrease an amount of data to be transmitted for a message authentication, and to decrease an amount of data to be buffered in the data reception apparatus 320. Accordingly, it is possible to more effectively cope with a DoS attack such as an overflow attack.

Figure 6:
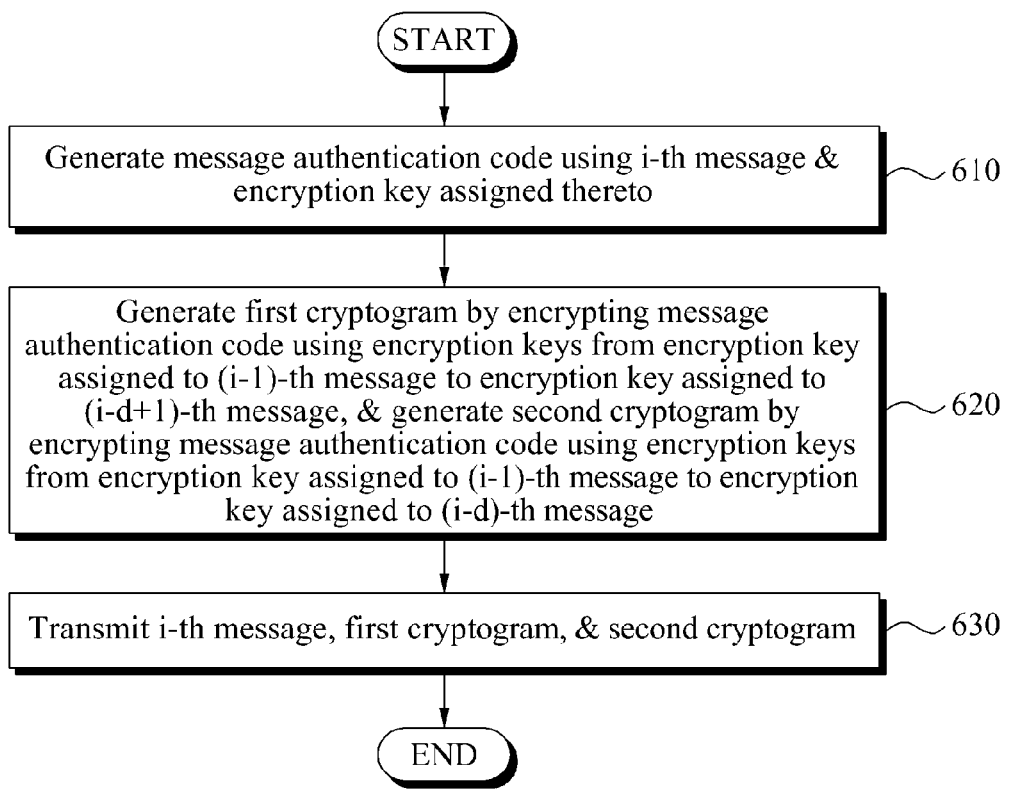
FIG. 6 is a flowchart illustrating an example of a method of transmitting data.

FIG. 6 illustrates a flowchart illustrating an example of a method of transmitting data.

At 610, the data transmission method generates a message authentication code MAC($K_i$, $M_i$) associated with an i-th message, that is, a message $M_i$, using the message $M_i$ and an encryption key $K_i$ assigned to the message $M_i$.

At 620, the data transmission method generates a first cryptogram, that is, a cryptogram $A_i$ by encrypting the message authentication code MAC($K_i$, $M_i$) using encryption keys from an encryption key assigned to an (i−1)-th message to an encryption key assigned to an (i−d+1)-th message, that is, using encryption keys from an encryption key $K_{i-1}$ assigned to a message $M_{i-1}$ to an encryption key $K_{i+d-1}$ assigned to a message $M_{i+d-1}$, and generates a cryptogram $C_i$ by encrypting the message authentication code MAC($K_i$, $M_i$) using encryption keys from the encryption key $K_{i-1}$ assigned to the message $M_{i-1}$ to an encryption key assigned to an (i-d)-th message, that is, an encryption key $K_{i-d}$ assigned to a message $M_{i-d}$.

Referring to FIG. 6, at 620, the data transmission method may generate the cryptogram $A_i$ by sequentially encrypting the message authentication code MAC($K_i$, $M_i$) using the encryption keys $K_{i-1}$ through $K_{i-d+1}$, and may generate the cryptogram $A_i$ by sequentially encrypting the message authentication code MAC($K_i$, $M_i$) using the encryption keys $K_{i-1}$ through $K_{i-d}$.

At 630, the data transmission method transmits the message $M_i$, the cryptogram $A_i$, and the cryptogram $C_i$. Here, the data transmission method may generate a data packet $\{M_i, A_i, C_i\}$ that includes the message $M_i$, the cryptogram $A_i$, and the cryptogram $C_i$, and may transmit the generated data packet $\{M_i, A_i, C_i\}$ to a data reception apparatus.

According to an example, the data transmission method may generate a data packet $\{M_i, A_i, C_i, K_{i-d}\}$ that further includes the encryption key $K_{i-d}$ assigned to the (i-d)-th message in addition to the message $M_i$, the cryptogram $A_i$, and the cryptogram $C_i$, and may transmit the generated data packet $\{M_i, A_i, C_i, K_{i-d}\}$.

Figure 7:
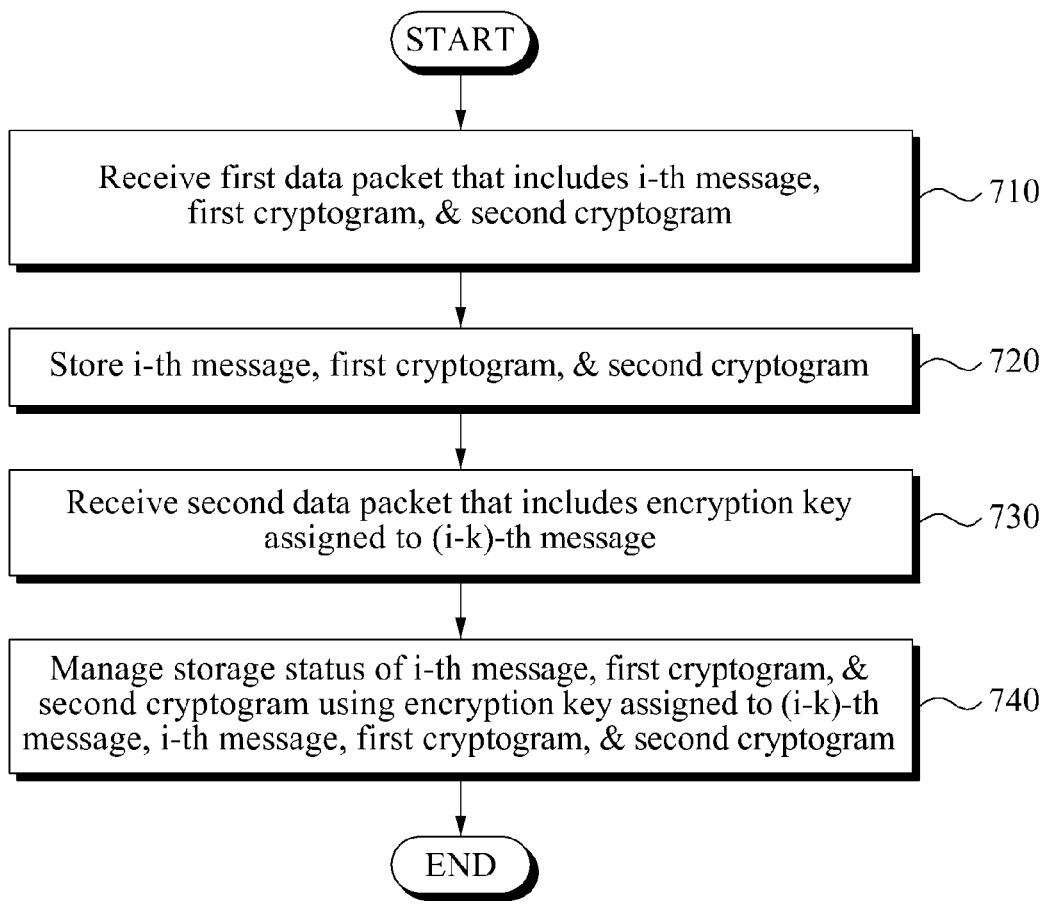
FIGS. 7 through 9 are flowcharts illustrating an example of a method of receiving data.
Figure 8:
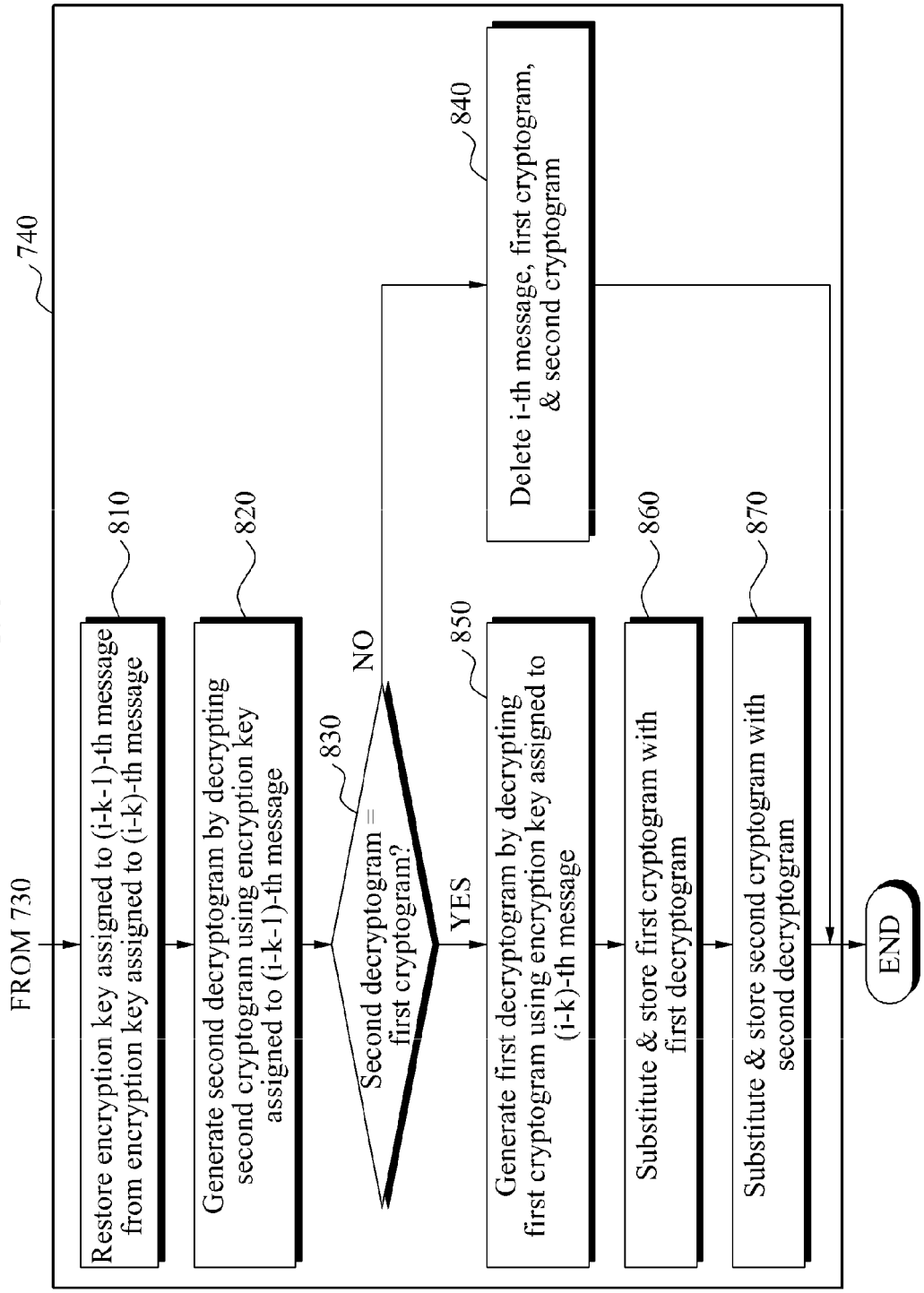
Figure 9:
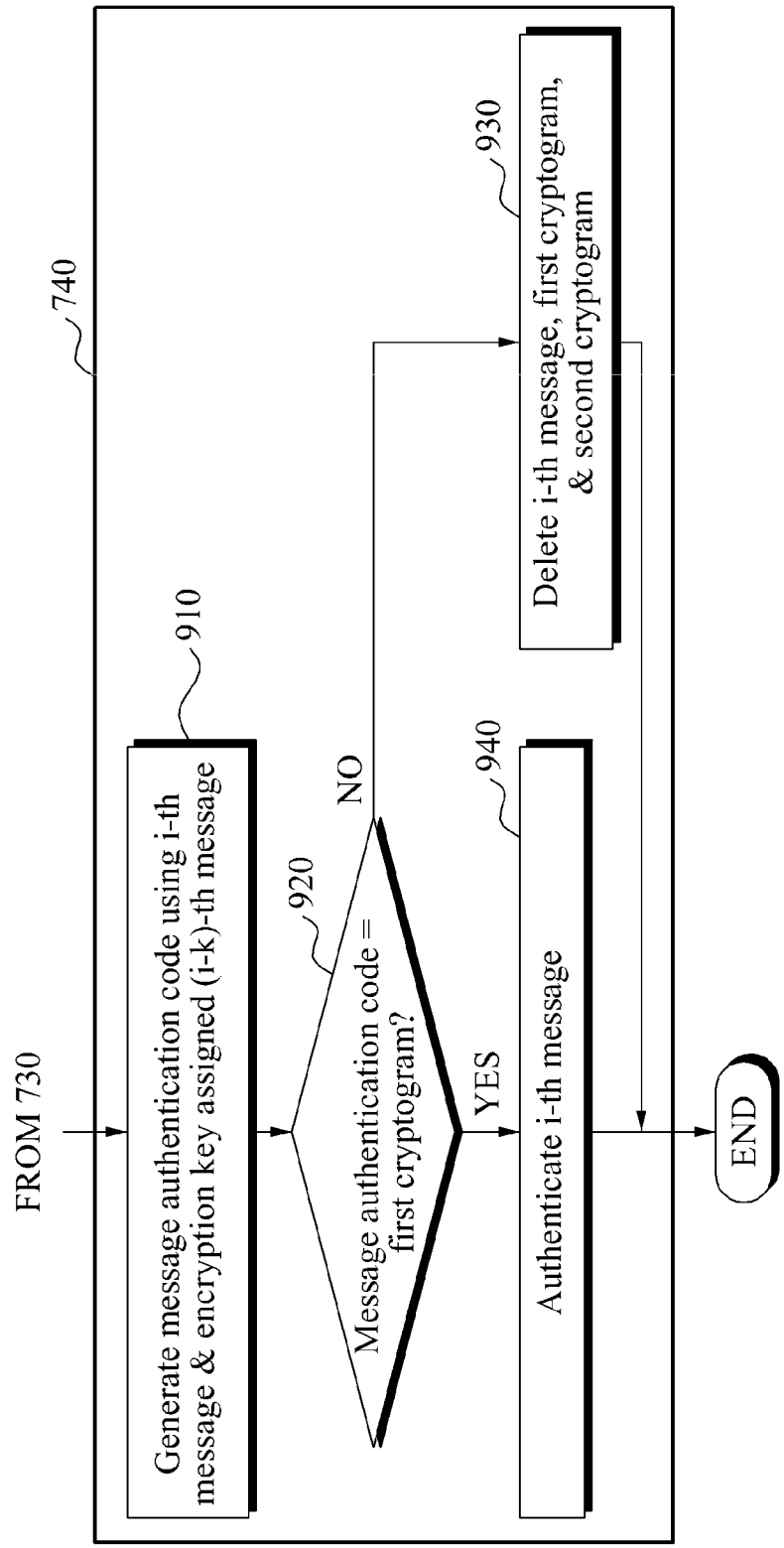

FIGS. 7 through 9 illustrate flowcharts illustrating an example of a method of receiving data.

At 710, a data reception apparatus receives a first data packet that includes an i-th message, that is, a message $M_i$, a first cryptogram associated with the message $M_i$, that is, a cryptogram $A_i$, and a second cryptogram associated with the message $M_i$, that is, a cryptogram $C_i$. For example, the data packet may be a data packet $\{M_i, A_i, C_i, K_{i-d}\}$.

According to FIG. 7, the cryptogram $A_i$ may be generated by sequentially encrypting a message authentication code MAC($K_i$, $M_i$) using encryption keys $K_{i-1}$ through $K_{i-d+1}$. The cryptogram $C_i$ may be generated by sequentially encrypting the message authentication code MAC($K_i$, $M_i$) using the encryption keys $K_{i-1}$ through $K_{i-d}$.

At 720, the data reception apparatus stores the message $M_i$, the cryptogram $A_i$, and the cryptogram $C_i$.

At 730, the data reception apparatus receives a second data packet that includes an encryption key $K_{i-k}$ assigned to an (i-k)-th message, that is, a message $M_{i-k}$. For example, the second data packet may be a data packet $\{M_j, A_j, C_j, K_{j-k}(=K_{i-k})\}$ transmitted in a j-th interval.

At 740, the data reception method manages a storage status of the message $M_i$, the cryptogram $A_i$, and the cryptogram $C_i$ using the encryption key $K_{i-k}$, the message $M_i$, the cryptogram $A_i$, and the cryptogram $C_i$.

Hereinafter, operation 740 will be further described with reference to FIGS. 8 and 9.

Where the second data packet is received in any one of (i+1)-th through (i+d−1)-th intervals, 740 of FIG. 7 may be performed as follows.

Referring to FIG. 8, at 810, the data reception method restores an encryption key $K_{i-k-1}$ assigned to a message $M_{i-k-1}$, from the encryption key $K_{i-k}$ assigned to the message $M_{i-k}$. In this case, the encryption key $K_{i-k-1}$ may be restored according to the above Equation 3.

At 820, the data reception method generates a decryptogram $C_1'$, that is, a second decryptogram by decrypting the cryptogram $C_i$ using the encryption key $K_{i-k-1}$.

At 830, the data reception method determines whether the decryptogram $C_i'$ is identical to the cryptogram $A_i$.

Where the decryptogram $C_i'$ is different from the cryptogram $A_i$, the data reception method deletes the message $M_i$, the cryptogram $A_i$, and the cryptogram $C_i$ at 840.

Conversely, where the decryptogram $C_i'$ is identical to the cryptogram $A_i$, the data reception method generates a decryptogram $A_i'$, that is, a first decryptogram by decrypting the cryptogram $A_i$ using the encryption key $K_{i-k}$ at 850.

At 860, the data reception method substitutes the cryptogram $A_i$ with the decryptogram $A_i'$, and stores the decryptogram $A_i'$.

At 870, the data reception method substitutes the cryptogram $C_i$ with the decryptogram $C_i'$, and stores the decryptogram $C_i'$.

Where the second data packet is received in an (i+d)-th interval, 740 of FIG. 7 may be performed as follows.

Referring to FIG. 9, at operation 910, the data reception method generates the message authentication code MAC($K_i$, $M_i$) associated with the message $M_i$ using the encryption key $K_i$ included in the data packet received in the (i+d)-th interval.

At 920, the data reception method determines whether the generated message authentication code MAC($K_i$, $M_i$) is identical to the stored cryptogram $A_i$.

Where the message authentication code MAC($K_i$, $M_i$) is different from the stored cryptogram $A_i$, the data reception method deletes the message $M_i$, the cryptogram $A_i$, and the cryptogram $C_i$ at 930.

Where the message authentication code MAC($K_i$, $M_i$) is identical to the stored cryptogram $A_i$, the data reception method authenticates the message $M_i$ as a valid message at 940.

Examples of a data transmission method and a data reception method are described above. Descriptions made above in relation to a configuration of a system 300 to transmit and receive data as depicted in FIG. 3 may be applicable as described. Therefore, further detailed descriptions will be omitted here.

The methods and/or operations described above including a data transmission and reception method may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for transmitting data, the apparatus comprising:
    an authentication code generator configured to generate a message authentication code using an i-th message and an encryption key assigned to the i-th message, wherein i denotes an integer;
    an encryption unit configured to generate a first cryptogram by encrypting the message authentication code using first encryption keys from an encryption key assigned to an (i−1)-th message to another encryption key assigned to an (i−d+1)-th message, and generate a second cryptogram by encrypting the message authentication code using second encryption keys from the encryption key assigned to the (i−1)-th message to a different encryption key assigned to an (i-d)-th message, wherein d denotes an integer greater than or equal to 1; and
    a transmitter configured to transmit the i-th message, the first cryptogram, and the second cryptogram, which are used to determine whether the i-th message is valid.

2. The apparatus of claim 1, wherein the encryption unit is further configured to generate the first cryptogram by sequentially encrypting the message authentication code using the first encryption keys ranging from the encryption key assigned to the (i−1)-th message to the other encryption key assigned to the (i−d+1)-th message; and generate the second cryptogram by sequentially encrypting the message authentication code using the second encryption keys ranging from the encryption key assigned to the (i−1)-th message to the different encryption key assigned to the (i-d)-th message.

3. The apparatus of claim 2, wherein the transmitter is further configured to transmit the different encryption key assigned to the (i-d)-th message with the i-th message, the first cryptogram, and the second cryptogram.

4. An apparatus for receiving data, the apparatus comprising:
    a receiver configured to receive a first data packet comprising an i-th message, a first cryptogram associated with the i-th message, and a second cryptogram associated with the i-th message, and a second data packet comprising an encryption key assigned to an (i-k)-th message, wherein
    i denotes an integer,
    k denotes an integer greater than or equal to zero,
    the first cryptogram is generated by encrypting a message authentication code using first encryption keys from an encryption key assigned to an (i−1)-th message to another encryption key assigned to an (i−d+1)-th message, and
    the second cryptogram is generated by encrypting the message authentication code using second encryption keys from the encryption key assigned to the (i−1)-th message to a different encryption key assigned to an (i-d)-th message, wherein d denotes an integer greater than or equal to 1;
    a storage unit configured to store the i-th message, the first cryptogram, and the second cryptogram; and
    a control unit configured to manage a storage status of the i-th message, the first cryptogram, and the second cryptogram using the encryption key assigned to the (i-k)-th message, the i-th message, the first cryptogram, and the second cryptogram.

5. The apparatus of claim 4, wherein the first cryptogram is generated by generating a message authentication code using the i-th message and an encryption key assigned to the i-th message, and sequentially encrypting the message authentication code and
    the second cryptogram is generated by sequentially encrypting the message authentication code.

6. The apparatus of claim 5, wherein the control unit is further configured to restore an encryption key assigned to an (i-k−1)-th message from the encryption key assigned to the (i-k)-th message, generate a second decryptogram by decrypting the second cryptogram using the restored encryption key assigned to the (i-k−1)-th message, and manage the storage status of the i-th message, the first cryptogram, and the second cryptogram based on a comparison between the first cryptogram and the second decryptogram.

7. The apparatus of claim 6, wherein the control unit is further configured to, in response to the second decryptogram being identical to the first cryptogram, generate a first decryptogram by decrypting the first cryptogram using the encryption key assigned to the (i-k)-th message, substitute the first cryptogram with the first decryptogram by storing the first decryptogram in the storage unit in place of the first cryptogram, and substitute the second cryptogram with the second decryptogram by storing the second decryptogram in the storage unit in place of the second cryptogram.

8. The apparatus of claim 6, wherein the control unit is further configured to, in response to the second decryptogram being different from the first cryptogram, delete, from the storage unit, the i-th message, the first cryptogram, and the second cryptogram.

9. The apparatus of claim 4, wherein the control unit is further configured to generate a message authentication code associated with the i-th message using the i-th message and the encryption key assigned to the (i-k)-th message, and manage the storage status of the i-th message, the first cryptogram, and the second cryptogram based on a comparison between the message authentication code and the first cryptogram.

10. The apparatus of claim 9, wherein the control unit is further configured to, in response to the message authentication code being different from the first cryptogram, delete, from the storage unit, the i-th message, the first cryptogram, and the second cryptogram.

11. A method of transmitting data, the method comprising:
generating, using a processor, a message authentication code using an i-th message and an encryption key assigned to the i-th message, wherein i denotes an integer;
generating, using the processor, a first cryptogram by encrypting the message authentication code using first encryption keys from an encryption key assigned to an (i−1)-th message to another encryption key assigned to an (i−d+1)-th message, and generating a second cryptogram by encrypting the message authentication code using second encryption keys from the encryption key assigned to the (i−1)-th message to a different encryption key assigned to an (i-d)-th message, wherein d denotes an integer greater than or equal to 1; and
transmitting, using the processor, the i-th message, the first cryptogram, and the second cryptogram, which are used to determine whether the i-th message is valid.

12. The method of claim 11, wherein the generating of the first cryptogram and the second cryptogram comprises:
generating the first cryptogram by sequentially encrypting the message authentication code using the first encryption keys ranging from the encryption key assigned to the (i−1)-th message to the other encryption key assigned to the (i−d+1)-th message; and
generating the second cryptogram by sequentially encrypting the message authentication code using the second encryption keys ranging from the encryption key assigned to the (i−1)-th message to the different encryption key assigned to the (i-d)-th message.

13. The method of claim 12, wherein the transmitting further comprises transmitting the different encryption key assigned to the (i-d)-th message together with the i-th message, the first cryptogram, and the second cryptogram.

14. A method of receiving data, the method comprising:
receiving, using a processor, a first data packet comprising an i-th message, a first cryptogram associated with the i-th message, and a second cryptogram associated with the i-th message, wherein
i denotes an integer,
the first cryptogram is generated by encrypting the message authentication code using first encryption keys from an encryption key assigned to an (i−1)-th message to another encryption key assigned to an (i−d+1)-th message, and
the second cryptogram is generated by encrypting the message authentication code using second encryption keys from the encryption keys assigned to the (i−1)-th message to a different encryption key assigned to an (i-d)-th message, wherein d denotes an integer greater than or equal to 1;
storing, using the processor, the i-th message, the first cryptogram, and the second cryptogram;
receiving, using the processor, a second data packet comprising an encryption key assigned to an (i-k)-th message, wherein k denotes an integer greater than or equal to zero; and
managing, using the processor, a storage status of the i-th message, the first cryptogram, and the second cryptogram using the encryption key assigned to the (i-k)-th message, the i-th message, the first cryptogram, and the second cryptogram.

15. The method of claim 14, wherein the first cryptogram is generated by generating a message authentication code using the i-th message and an encryption key assigned to the i-th message, and generating the first cryptogram by sequentially encrypting the message authentication code; and
the second cryptogram is generated by sequentially encrypting the message authentication code.

16. The method of claim 15, wherein the managing comprises:
restoring an encryption key assigned to an (i-k−1)-th message from the encryption key assigned to the (i-k)-th message;
generating a second decryptogram by decrypting the second cryptogram using the restored encryption key assigned to the (i-k−1)-th message; and
managing the storage status of the i-th message, the first cryptogram, and the second cryptogram based on a comparison between the first cryptogram and the second decryptogram.

17. The method of claim 16, wherein the managing further comprises, in response to the second decryptogram being identical to the first cryptogram:
generating a first decryptogram by decrypting the first cryptogram using the encryption key assigned to the (i-k)-th message;
substituting the first cryptogram with the first decryptogram by storing the first decryptogram in place of the first cryptogram; and
substituting the second cryptogram with the second decryptogram by storing the second decryptogram in place of the second cryptogram.

18. The method of claim 16, wherein the managing comprises, in response to the second decryptogram being different from the first cryptogram, deleting the stored i-th message, the stored first cryptogram, and the stored second cryptogram.

19. The method of claim 14, wherein the managing comprises:
generating a message authentication code associated with the i-th message using the i-th message and the encryption key assigned to the (i-k)-th message; and
managing the storage status of the i-th message, the first cryptogram, and the second cryptogram based on a comparison between the message authentication code and the first cryptogram.

20. A system for transmitting and receiving data, the system comprising:
- an authentication code generator configured to generate a message authentication code using an i-th message and an encryption key assigned to the i-th message, wherein i denotes an integer;
- an encryption unit configured to generate a first cryptogram by encrypting the message authentication code using first encryption keys from an encryption key assigned to an (i−1)-th message to another encryption key assigned to an (i−d+1)-th message, and generate a second cryptogram by encrypting the message authentication code using second encryption keys from the encryption key assigned to the (i−1)-th message to a different encryption key assigned to an (i-d)-th message, wherein d denotes an integer greater than or equal to 1;
- a transmitter configured to transmit a first data packet comprising the i-th message, the first cryptogram, and the second cryptogram, and a second data packet comprising the different encryption key assigned to the (i-d)-th message, which are used to determine whether the i-th message is valid;
- a receiver configured to receive the first data packet comprising the i-th message, the first cryptogram, the second cryptogram, and the second data packet comprising the different encryption key assigned to the (i-d)-th message;
- a storage unit configured to store the i-th message, the first cryptogram, and the second cryptogram; and
- a control unit configured to manage a storage status of the i-th message, the first cryptogram, and the second using the different encryption key assigned to the (i-d)-th message, the i-th message, the first cryptogram, and the second cryptogram.

* * * * *